(12) United States Patent
Kirchfeld et al.

(10) Patent No.: US 10,986,045 B2
(45) Date of Patent: Apr. 20, 2021

(54) INTEGRATION HUB

(71) Applicant: SAP SE, Walldorf (DE)

(72) Inventors: Stefan Kirchfeld, Sunnyvale, CA (US); Sean Doyle, Mountain View, CA (US); Martin Steiner, San Francisco, CA (US); Matthias Kruse, Redwood City, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/517,816

(22) Filed: Jul. 22, 2019

(65) Prior Publication Data

US 2020/0195591 A1 Jun. 18, 2020

Related U.S. Application Data

(60) Provisional application No. 62/781,066, filed on Dec. 18, 2018.

(51) Int. Cl.
*H04L 12/58* (2006.01)

(52) U.S. Cl.
CPC .............. *H04L 51/02* (2013.01); *H04L 51/16* (2013.01); *H04L 51/046* (2013.01)

(58) Field of Classification Search
CPC ....... H04L 51/02; H04L 51/16; H04L 41/046; H04L 51/046
See application file for complete search history.

(56) References Cited

U.S. PATENT DOCUMENTS

| | | | | |
|---|---|---|---|---|
| 7,657,465 | B2 * | 2/2010 | Freishtat | G06Q 30/01 |
| | | | | 705/26.41 |
| 2006/0074831 | A1 * | 4/2006 | Hyder | G06N 5/02 |
| | | | | 706/45 |
| 2017/0180276 | A1 * | 6/2017 | Gershony | H04L 51/18 |
| 2018/0150524 | A1 * | 5/2018 | Anger | G06F 16/9535 |
| 2018/0181558 | A1 * | 6/2018 | Emery | H04M 3/4936 |
| 2018/0287968 | A1 * | 10/2018 | Koukoumidis | G06F 16/248 |
| 2018/0293484 | A1 * | 10/2018 | Wang | G06F 3/167 |
| 2019/0068527 | A1 * | 2/2019 | Chen | G06Q 10/00 |
| 2019/0140986 | A1 * | 5/2019 | Anderson | G10L 15/1822 |
| 2019/0213466 | A1 * | 7/2019 | Jeswani | H04L 51/02 |
| 2019/0325081 | A1 * | 10/2019 | Liu | G10L 15/183 |
| 2019/0379615 | A1 * | 12/2019 | Karp | H04L 51/02 |
| 2020/0105273 | A1 * | 4/2020 | O'Donovan | G10L 15/22 |

* cited by examiner

*Primary Examiner* — Aaron N Strange
(74) *Attorney, Agent, or Firm* — Sterne, Kessler, Goldstein & Fox P.L.L.C.

(57) ABSTRACT

Disclosed herein are system, method, and computer program product embodiments for providing a single point of interaction for communicating with a first agent and a second agent. An embodiment operates by a server sending a preliminary request for a preliminary response to the first agent and the second agent and, based on the preliminary request, receiving the preliminary response from the first agent. Thereafter, the server determines that the first agent is a preferred agent based on the preliminary response and maintains a line of communication to the preferred agent. The server then sends a follow-up request for a follow-up response different from the preliminary request to the preferred agent over the line of communication and receives the follow-up response from the preferred agent over the line of communication.

20 Claims, 3 Drawing Sheets

INTEGRATION HUB

CROSS REFERENCE TO RELATED APPLICATIONS

This application claims priority to U.S. Provisional Patent Application No. 62/781,066, filed on Dec. 18, 2018, which is herein incorporated by reference in its entirety.

BACKGROUND

Computer programs are becoming more voluminous and capable of performing a wide range of functions. They are becoming progressively more helpful and useful for users in many different ways. For example, one computer program may manage appointments, another computer program may provide access to a corporate database, and yet another computer program may store personal client information. But, although computer programs provide users with diverse capabilities, they often become cumbersome to manage due to their sheer volume and complexity. Moreover, users may forget a particular computer program's capabilities, location on a device, and method of operation.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a single point of interaction for communicating with a plurality of backend agents. The single point of interaction may be provided by a request broker managing backend agents running different computer programs. The request broker can receive user input and communicate with each backend agent directly to determine an appropriate backend agent to provide feedback to the user based on the user input. After determining the appropriate backend agent, the request broker can maintain a direct line of communication therewith and receive feedback for the user based on the user input. This can be accomplished without the user knowing the identity of the backend agents and without interacting with them directly.

Figure 1:
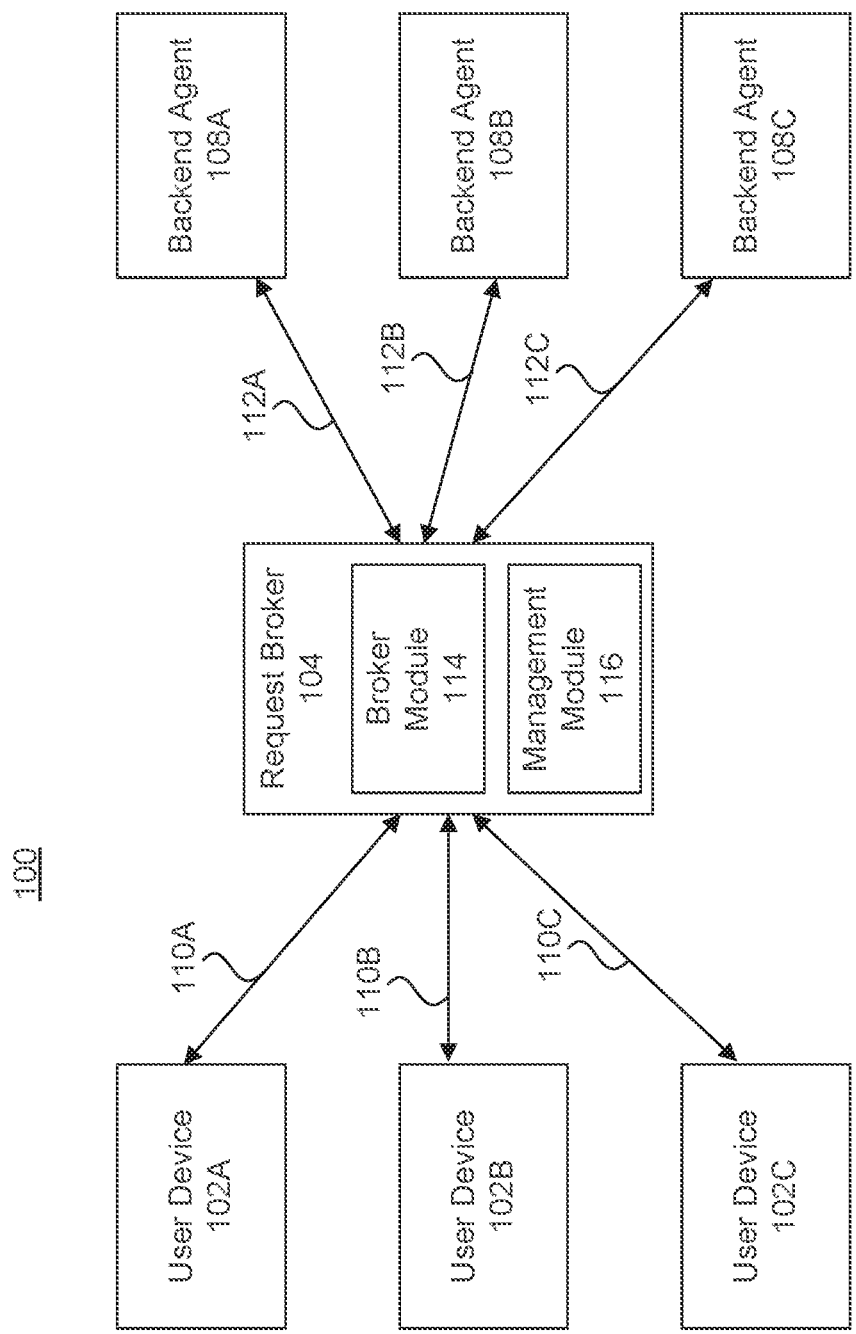
FIG. 1 is a block diagram of a system for providing a single point of interaction for communicating with a plurality of backend agents, according to some embodiments.

Referring now to FIG. 1, a block diagram of a system 100 for providing a single point of interaction for communicating with a plurality of backend agents 108 is illustrated. The system 100 may comprise one or more user devices 102, a request broker 104, and/or one or more backend agents 108. The request broker 104 may be managed by a specific entity. As such, backend agents 108 may be managed by the same or different entity as the request broker 104. For example, backend agent 108A may be managed by the same entity as the request broker 104, and backend agent 108B, 108C may be managed by different entities than the request broker 104. The term "entity" as used herein may refer to a business or organization.

As such, the backend agents 108 may be approved by the request broker 104 to be part of the system 100. Once approved, the backend agents 108 may provide computer programs for supporting the entity managing the request broker 104 and/or the users of the user devices 102. For example, the backend agent 108A may provide a computer program for providing financial information of the entity, the backend agent 108B may provide a computer program for providing shipment information for the entity, and the backend agent 108C may provide a computer program for providing employee information of the entity. Along these lines, the request broker 104 may be in communication with hundreds of backend agents 108 running different computer programs.

In the example of FIG. 1, the request broker 104 may be in communication with the user devices 102 over a first communication line 110 and the backend agents over a second communication line 112. The first communication line 110 and the second communication 112 may be public and/or private. For example, the first communication line 110 and the second communication line 112 may each be private. Along these lines, the first communication line 110 and the second communication line 112 may each provide a secure line of communication for an entity. As such, the first communication line 110 and the second communication line 112, and the third communication line 112 may be managed by the entity managing the request broker 104. Although FIG. 1 illustrates a plurality of first and second communication lines 110 and 12, the first and second communication lines 110 and 112 may be a single communication line or multiple communication lines, as will be understood by a person of ordinary skill in the art.

The user devices 102 may be managed and/or owned by the request broker 104. As such, the user devices 102 may require unique credentials (e.g., username and password) from the user to log in and communicate with the request broker 104. The unique credentials may be provided by the entity managing the request broker 104. By doing so, the user devices 102 may access the backend agents 108 via the request broker 104.

Upon logging in, the user device 102 may receive user input relating to a particular intent of the user, as will be described in more detail below. The user input may comprise structured and/or unstructured data. Along these lines, the user input may be provided as a natural language in the form of a voice or text, and/or as an image. For instance, user input may permit a user to query for entity information, e.g., using various filter parameters. Along these lines, the user input may relate to a single operation or a collection of operations for computer programs of the backend agents 108. For example, in referring to a single operation, the user input may be "create a leave request," "show leave request history," or "cancel leave request." The user input may also be "manage leave requests," which comprises and presents the aforementioned types of requests together in a display screen.

Furthermore, the user input may also specify particular backend agents 108 for communication therewith (e.g., backend agent 108A). This may result in the request broker 104 communicating exclusively with the particular backend agents 108. As a result, as discussed in more detail below, instead of first determining an appropriate backend agent 108 to communicate therewith, the request broker 104 may create a direct line of communication with the requested backend agent 108 for communication therewith. Alternatively, the user input may not specify any particular backend agents 108 for the communication therewith. This may result in the request broker 104 communicating with each of the backend agents 108 to determine an appropriate response based on the user input. As a result, as will be discussed in more detail below, the request broker 104 may first determine an appropriate backend agent 108 to communicate therewith before setting up a direct line of communication with an appropriate backend agent 108 for communication therewith.

The request broker 104 may comprise a broker module 114 and a management module 116, each of which is in communication with each other. The broker module 114 may manage communications between the user devices 102 and the backend agents 108, as will be discussed in more detail below. However, depending on whether the request broker 104 and the backend agent 108 are managed by the same entity, the management module 116 may require the backend agents 108 to register therewith in order to communicate with the broker module 114 and/or provide responses to the user device 102 through the request broker 104. For example, where the request broker 104 and the backend agent 108 are managed by the same entity, the management module 116 may not require backend agents 108 to register therewith. Alternatively, where the request broker 104 and the backend agents 108 are not managed by the same entity (e.g., the backend agents 108 are third-party agents), the management module 116 may require backend agents 108 to register therewith. Along these lines, irrespective of whether the request broker 104 and the backend agent 108 are managed by the same entity, the management module 116 may require the backend agents 108 to register therewith. This may allow the management module 116 to maintain a repository of the backend agents 108 in communication with the request broker 104.

The management module 116 may also comprise metadata relating to the backend agents 108 for communicating with the backend agents 108. The metadata may include a name of the backend agents 108 for calling the backend agents 108, an identification of the backend agents 108, a location or destination of the backend agents 108 (e.g., where a request is being sent), a type of protocol for the backend agents 108, an indication of whether the request broker 104 should wait for a particular backend agent 108, a length of time that the request broker 104 should wait for a response from a particular backend agents 108, a type of information that the backend agents 108 hold, additional configurations required by the backend agents 108 to receive requests (e.g., where particular backend agents 108 require certain headers), a designated priority of the backend agents 108, and/or a request timeout for the backend agents 108 for a period of time (e.g., if they do not respond to the backend agents 108 after a certain time).

As discussed above, the backend agents 108 may represent or execute one or more computer programs. The computer programs may be different or the same from each other. The computer programs may be bots and thus may act as a virtual assistant. The bots may comprise artificial intelligence and respond to requests from the request broker 104. Moreover, the computer programs may be capable of standing alone and performing their functions without association with each other. Along these lines, the backend agents 108 may receive input directly from users at user devices 102 and/or provide output to users at user device 102, without interaction of the request broker 104. In doing so, the backend agents 108 may provide unique interfaces to the users at user devices 102, which may be different than the user interface provided by the request broker 104 to the users at user devices 102. Moreover, the backend agents 108 may provide predesignated protocols for communicating with the user devices, which may be different than that from which the backend agents 108 communicate with the request broker 104.

The request broker 104 may be in communication with the user devices 102 separately from the backend agents 108. As such, the user devices 102 may only communicate with the request broker 104 (i.e., not the backend agents 108). Thus, the request broker 104 may hide the backend agents 108 from the users at user devices 102 such that the users at user device 102 are not aware of the backend agents 108. Along these lines, the request broker 104 may provide no indication of which backend agents 108 that users at user device 102 are communicating at any time during communication.

As discussed above, the request broker 104's broker module 114 may manage communications between the user devices 102 and the backend agents 108. In doing so, the broker module 114 may not have specified communication protocols for doing so. Accordingly, the broker module 114 may be unaware of some of the programs of the backend agents 108. For example, if the entity managing the request broker 104 does not own and/or manage the backend agents 108 (i.e., the third-party backend agents 108 are owned and/or managed by third parties), the broker module 114 may be unaware of the programs of the backend agents 108. However, if the entity managing the request broker 104 also manages and/or owns the backend agents 108, they may be aware of the programs of the backend agents 108.

After receiving the user input, the broker module 114 may first determine if a particular backend agent 108 was specified by users at user device 102. If a particular backend agent 108 was specified, the broker module 114 may set up a direct line of communication from the request broker 104 to the particular backend agent. However, if a particular backend agent 108 was not specified by the user, the broker module 114 may provide a preliminary determination if any of the backend agents 108 may or may not provide an appropriate or best response to the user input. For example, if the user input is "where shipments are to be received today," the broker module 114 may determine that backend agents 108A and 108B will provide an appropriate/best response or that backend agent 108C will not provide an appropriate response. This may be based on the request broker 104 being aware of the backend agents 108's computer programs as discussed above.

As mentioned above, the request broker 104's broker module 114 may also be in communication with the backend agents 108 to determine if a particular backend agent has an appropriate or best response for the user input. To do so, the broker module 114 may send a preliminary request for a preliminary response to each backend agent 108. The preliminary requests may be sent to the backend agents 108 synchronously or asynchronously. The preliminary request may comprise a request type and input provided by the user at user device 102. As such, the request type may indicate that the request is a preliminary request as compared to a follow-up request, as will be discussed in more detail below. Moreover, the input provided by the user at the user devices 102 may allow the backend agents 108 some content to assess a confidence level of providing an appropriate/best response, as will also be discussed in more detail below.

Upon receipt of the preliminary request, backend agents 108 may determine if they have sufficient information for providing a response to the user input. If sufficient information is determined, the backend agents 108 may send a preliminary response to the broker module 114. As such, all backend agents 108 may not be required to respond to the broker module 114. For example, backend agents 108A, 108B may provide a preliminary response to the broker module 114, and backend agent 108C may not provide a preliminary response to the broker module 114.

Thus, the preliminary response may comprise a response type (e.g., Act), an indication that the backend agent 108 has sufficient information (e.g., Yes. No, Maybe), and/or a confidence level relating to the sufficiency of the information. The confidence level may provide a measure of how likely the backend agent 108 will provide an accurate outcome based on the user input. As such, the confidence level may be within a predefined range (e.g., 0 to 3 or 0 to 100). For example, if the user input is to "create a sales order for headsets 123" and backend agents 108A and 108B know how to create sales orders for "headsets 12" and "headsets 123," respectively, the confidence level of the backend agent 108A may be 2 (the second highest confidence level) and the confidence level of the backend agent 108B may be 1 (the highest confidence level). By receiving the preliminary request, the backend agents 108 may more quickly process the outcome, and the broker module 114 may more quickly receive an answer from the backend agents 108 and determine which backend agents 108 have an appropriate or best results.

Upon receipt of the preliminary response, the broker module 114 may access the response type, the indication of sufficient information, and/or confidence level provided of the backend agents 108. As such, the broker module 114 may select a particular backend agent 108 having a highest confidence level (e.g., "1"). Thus, the broker module 114 may determine if any backend agents 108 have a priority "1" and if not, move onto priority "2", and so on. Along these lines, the server 108 may select backend agents 108 meeting a predefined threshold (e.g., "2"), which may be set by an administrator. Thus, the broker module 114 may consider and send follow-up requests to multiple backend agents 108.

Moreover, the broker module 114 may determine whether the backend agent 108' indication of sufficient information and/or confidence level is above a predefined level. The predefined level for the indication of sufficient information may be "Maybe," and the predefined level for the confidence level may be "2." Along these lines, the broker module 114 may determine if at least two of the broker agents 104' confidence level are within a predefined range. For example, if the confidence level is from 0-100, the broker agent may determine if that least two broker agents 104' confidence are within 10 (e.g., 90 and 86). As such, the predefined level for the indication of sufficient information, and predefined level and range for the confidence level, of the backend agents 108 may be provided by the entity managing the request broker 104.

Accordingly, the broker module 114 may permit multiple backend agents 104 to provide acceptable preliminary responses. The broker module 114 may then provide direct lines of communication with each of the backend agents 104, as will be described in more detail below. Alternatively, the broker module 114 may provide a preliminary outcome to the user devices 102 in response to the backend agents 104' preliminary responses. For example, if the user input is "retrieve John's order for Aug. 15, 2018," the broker module 114 may deem multiple backend agents 108 as having sufficient preliminary responses.

In addition to the response type, the indication of sufficient information, and/or confidence level provided by the backend agents 108, the broker module 114 may also consider a priority of the backend agents 108. The backend agents 108 may be given prioritization by a system administrator of the entity managing the request broker 104. Along these lines, the backend agents 108 that are prioritized may be those managed by the entity managing the request broker 104. Moreover, the prioritization of the backend agents 108 may be completely independent from the confidence level of the backend agents 108. As such, although backend agent 108A may have a higher original confidence level than backend agent 108B, the broker module 114 may select backend agent 108B due to it being deemed a priority.

After receiving the preliminary response, the broker module 114 may then identify appropriate backend agents 108 as preferred agents for sending a follow-up request thereto. After selecting the backend agent 108 to serve as the preferred agent, the broker module 114 may then maintain a direct line of communication therewith. The broker module 114 may then send a follow-up request to the preliminary request directly to the backend agent 108 over the direct line of communication. The follow-up request to the preliminary request may only include a request type (i.e., not include the user input) since the user input was already transmitted thereto (i.e., in the preliminary request). This may allow faster communication between the broker module 114 and the backend agent 108, and thereby allow the broker module 114 to provide quicker results to the user devices 102. The request type for the follow-up request may be different than that for preliminary requests (e.g., Converse).

Moreover, while the direct line of communication is maintained, the broker module 114 may send additional follow-up requests for additional follow-up responses directly to the backend agent 108. The additional follow-up requests may be sent without sending preliminary requests and the request broker receiving preliminary responses. Unlike the follow-up request to the preliminary request, the additional follow-up requests may each comprise a request type and user input. The request type for the additional follow-up requests may be different from that for preliminary requests and the same as that of previous additional responses (e.g., Converse).

Prior to transmitting the user input to the backend agent 108 in the preliminary request and/or follow-up request, the request broker 104 may not perform analysis of the user input. Rather, the backend agent 108 may only perform analysis of the user input. As such, the request broker 104 may merely pass the user input from the user devices 102 to the backend agents 108. This may be beneficial as backend agent 108 may analyze user input differently, such as when the backend agents 108 are managed by different entities.

As such, the direct line of communication between the broker module 114 and the backend agent 108 may be maintained for a period of time. The period of time may be at least a time starting the first follow-up request and continuing for multiple follow-up responses. The period of time may also be based on user input (e.g., an affirmative user input to end communication) or on the intent type (e.g., the type of action the user is performing coming to a completion). As such, the period of time may be based on the completion of a conversation between the user devices 102 and the backend agents 108 via the broker module 114. The period of time may further be terminated by the broker module 114 and/or the backend agent 108. For example, as discussed above, the direct line of communication may be terminated by the broker module 114 if the backend agents 108 do not timely respond to a request Along these lines, while the direct line of communication is maintained with the backend agent 108, the broker module 114 may send additional preliminary requests to each of the backend agents 108 (e.g., second preliminary request) and receive additional preliminary responses from at least one of the backend agents 108 in the same fashion as discussed above (i.e., the same or different backend agent than the previous backend agent that the broker module 114 is maintaining the direct line of communication with) (e.g., second preliminary responses). The additional preliminary requests may be based on different user input than previous preliminary requests. As such, the broker module 114 may determine whether to maintain additional direct lines of communication with different backend agents 108. Thus, the broker module 114 may maintain multiple direct lines of communication between different backend agents 108 simultaneously. The lines of communication may be maintained for different or the same periods of time in the same fashion as discussed above.

Moreover, the broker module 114 may send/receive messages from the backend agents 108 at the same time. For instance, during an initial determination, based on a preliminary response from multiple backend agents 108, the broker module 114 may elect to set up and maintain direct lines of communication with multiple backend agents 108. This may allow a user to receive follow-up responses from multiple backend agents 108 based on the same user input. Along these lines, in determining whether to maintain an additional direct line of communication or while maintaining the additional direct line of communication, the broker module 114 may send requests and receive preliminary and/or follow-up answers from different backend agents 108 concurrently. This may allow a user to communicate with multiple backend agents 108 at the same time, based on the same or different user input, without terminating the direct line of communication with the backend agents 108.

Furthermore, the communication between the broker module 114 and the backend agents 108 may be based on a common language. As such, this common language may be different than that offered by the backend agents 108 for communication directly with the user devices 102. Along these lines, the broker module 114 may require the backend agents 108 to provide responses in a preselected format. The preselected format may be different than that offered by the backend agents 108 for communication directly with the user devices 102. The preselected format may indicate how the backend agents are to structure responses to the broker module 114. This may allow the broker module 114 to receive and quickly decipher the preselected format from the backend agents 108 to present in an interface to the users at user devices 102.

Moreover, as previously indicated, the request broker 104 may provide a unique interface to users at user devices 102. The unique interface may be different than that offered by the backend agents 108 to users at user devices 102. The unique interface may not allow users at user devices 102 to determine if output provided to users at user devices 102 is from different backend agents 108.

Figure 2:
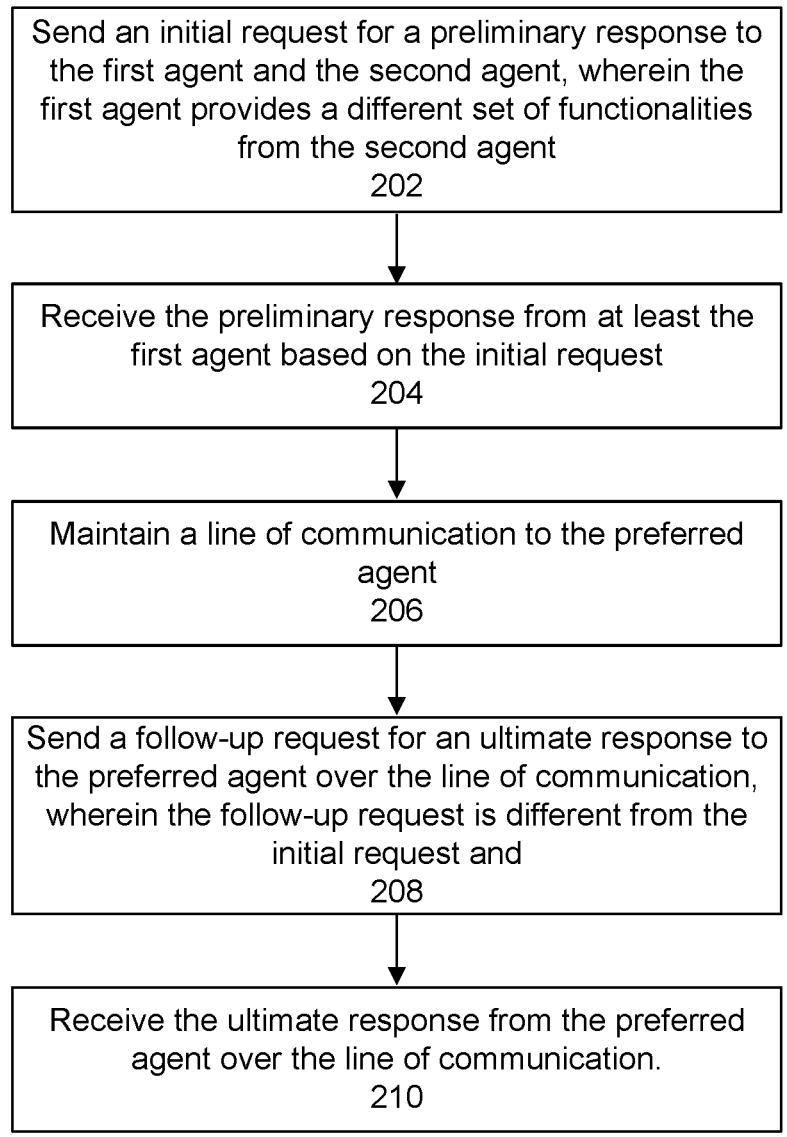
FIG. 2 is a flowchart illustrating a process for providing a single point of interaction for communicating with a plurality of backend agents, according to some embodiments.

FIG. 2 is a flowchart for a method 200 for providing a single point of interaction for communication with a plurality of backend agents, according to an embodiment. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, the request broker 104 sends a preliminary request for a preliminary response to a first agent 108A and a second agent 108B. The first and second agents 108A, 108B may have different functionalities and may be in communication with the request broker on a private communication line. The preliminary request may comprise a request type and user input.

In 204, the request broker 104 receives the preliminary response from at least the first agent 108A based on the preliminary request. The request broker 104 may receive different preliminary responses from the first and second agents 108A, 108B. The preliminary responses may comprise a confidence level.

In 206, the request broker 104 determines that the first agent 108A is a preferred agent based on the preliminary response. The first agent 108A may be the preferred agent based on the confidence level. Alternatively, although the first agent 108A is the preferred agent, the second agent 108B may have a higher confidence level.

In 208, the request broker 104 maintains a line of communication to the preferred agent. The line of communication may be maintained until terminated by the preferred agent, request broker, and/or user at the user device.

In 210, the request broker 104 sends a follow-up request for a follow-up response to the preferred agent over the line of communication. The follow-up request may have a different response type than the response type for the preliminary request. The follow-up request may only include a request type.

Figure 3:
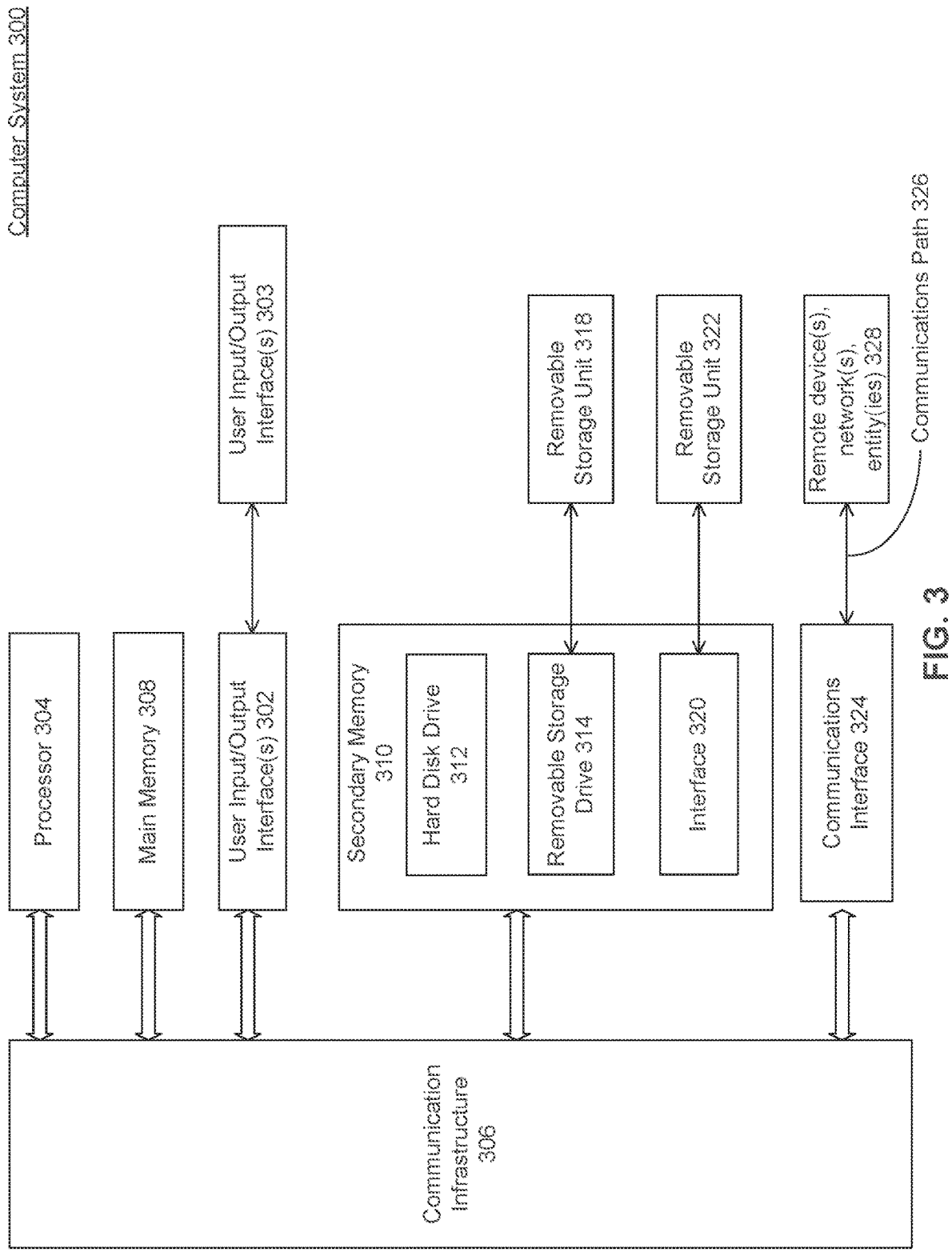
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk. DVD, optical storage disk, and/any other computer data storage device. Removable storage drive 314 may) read from and/or write to the removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for providing a single point of interaction for communicating with at least a first agent and a second agent, comprising:
    receiving, by a server, an input from a user;
    sending, by the server, a first preliminary request comprising the input to the first agent and the second agent, wherein the first agent provides a different set of functionalities from the second agent;
    receiving, by the server, a first preliminary response from the first agent based on the first preliminary request, the first preliminary response comprising a first confidence level measuring a likelihood of the first agent providing an accurate outcome based on the input;
    determining, by the server, that the first agent is a first preferred agent based on the first preliminary response;
    maintaining, by the server, a first line of communication to the first preferred agent;
    sending, by the server, a first follow-up request to the first preferred agent over the first line of communication, the first follow-up request omitting the input, wherein the first follow-up request is different from the first preliminary request;
    receiving, by the server and based on the first follow-up request, a first follow-up response to the input from the first preferred agent over the first line of communication, wherein the first follow-up response is different from the first preliminary response; and
    presenting the first follow-up response to the user.

2. The computer-implemented method of claim 1, wherein each of the first agent and the second agent comprises a bot.

3. The method of claim 1, wherein the server and the first agent are managed by different entities.

4. The computer-implemented method of claim 1, additionally comprising:
    registering, by the server, the first agent and the second agent.

5. The computer-implemented method of claim 1, additionally comprising:
    receiving, by the server, a second preliminary response from the second agent based on the first preliminary request, the second preliminary response comprising a second confidence level measuring a likelihood of the second agent providing an accurate outcome based on the input.

6. The computer-implemented method of claim 5, additionally comprising:
    designating, by the server, the first preliminary response from the first agent with a first priority; and
    designating, by the server, the second preliminary response from the second agent with a second priority less than the first priority,
    wherein the second confidence level is higher than the first confidence level, and
    wherein determining that the first agent is the first preferred agent is further based on the first priority exceeding the second priority.

7. The computer-implemented method of claim 5, wherein determining that the first agent is the first preferred agent is based on the first confidence level associated with the first agent being higher than the second confidence level associated with the second agent.

8. The computer-implemented method of claim 1, wherein the first preliminary request includes a preliminary response type and the first follow-up request includes a follow-up request type different from the preliminary response type.

9. The computer-implemented method of claim 1, further comprising:
    sending, by the server, a second follow-up request for a second follow-up response to the first preferred agent over the first line of communication, wherein the second follow-up request is different from the first preliminary request and the first follow-up request; and
    receiving, by the server, the second follow-up response from the first preferred agent over the first line of communication,
    wherein the second follow-up response is different from the first preliminary response and the first follow-up response, and
    wherein the first line of communication to the first preferred agent is maintained for a period of time beginning from the determination of the first agent being the first preferred agent to the receipt of the second follow-up response.

10. The computer-implemented method of claim 1, further comprising:
    sending, by the server, a second preliminary request for a second preliminary response to the first agent and the second agent, wherein the second preliminary request and the second preliminary response are different from the first preliminary request and the first preliminary response, respectively;
    receiving, by the server, the second preliminary response from at least the second agent based on the second preliminary request;
    determining, by the server, that the second agent is a second preferred agent based on the second preliminary response;
    maintaining, by the server, a second line of communication to the second preferred agent, wherein the second line of communication is different from the first line of communication;
    sending, by the server, a second follow-up request for a second follow-up response to the second preferred agent over the second line of communication, wherein the second follow-up request is different from the second preliminary request, and wherein the second follow-up request and the second follow-up response are different from the first follow-up request and the first follow-up response, respectively; and
    receiving, by the server, the second follow-up response from the second preferred agent over the second line of communication,
    wherein the second follow-up response is different from the second preliminary response.

11. The computer-implemented method of claim 10, wherein the second preliminary request for the second preliminary response is sent to the first agent and the second agent based on the input from the user.

12. The computer-implemented method of claim 10, wherein at least one of the sending of the second preliminary request, the receiving of the second preliminary request, the maintaining of the second line of communication, the sending of the second follow-up request, and the receiving of the second follow-up response is performed concurrently with at least one of the sending of the first preliminary request, the receiving of the first preliminary request, the maintaining of the first line of communication, the sending of the first follow-up request, and the receiving of the first follow-up response.

13. A system, comprising:
a memory; and
at least one processor coupled to the memory and configured to:
  receive an input from a user;
  send a preliminary request comprising the input to a first agent and a second agent, wherein the first agent provides a different set of functionalities from the second agent;
  receive a first preliminary response from the first agent based on the preliminary request, the first preliminary response comprising a first confidence level measuring a likelihood of the first agent providing an accurate outcome based on the input;
  determine that the first agent is a preferred agent based on the first preliminary response;
  maintain a line of communication to the preferred agent;
  send a follow-up request to the preferred agent over the line of communication, the follow-up request omitting the input, wherein the follow-up request is different from the preliminary request;
  receive, based on the follow-up request, a follow-up response to the input from the preferred agent over the line of communication, wherein the follow-up response is different from the first preliminary response; and
  present the follow-up response to the user.

14. The system of claim 13, wherein the at least one processor is further configured to:
receive a second preliminary response from the second agent based on the preliminary request, the second preliminary response comprising a second confidence level measuring a likelihood of the second agent providing an accurate outcome based on the input.

15. The system of claim 14, wherein the processor is further configured to:
designate the first preliminary response from the first agent with a first priority; and
designate the second preliminary response from the second agent with a second priority less than the first priority,
wherein the second confidence level is higher than the first confidence level, and
wherein determining that the first agent is the first preferred agent is further based on the first priority exceeding the second priority.

16. The system of claim 14, wherein determining that the first agent is the preferred agent is based on the first confidence level associated with the first agent being higher than the second confidence level associated with the second agent.

17. A non-transitory computer-readable medium (CRM) having instructions stored thereon that, when executed by at least one computing device, cause the at least one computing device to perform operations comprising:
receiving an input from a user;
sending a preliminary request comprising the input to a first agent and a second agent, wherein the first agent provides a different set of functionalities from the second agent;
receiving a first preliminary response from the first agent based on the preliminary request, the first preliminary response comprising a first confidence level measuring a likelihood of the first agent providing an accurate outcome based on the input;
determining that the first agent is a preferred agent based on the first preliminary response;
maintaining a line of communication to the preferred agent;
sending a follow-up request to the preferred agent over the line of communication, the follow-up request omitting the input, wherein the follow-up request is different from the preliminary request;
receiving based on the follow-up request, a follow-up response to the input from the preferred agent over the line of communication, wherein the follow-up response is different from the first preliminary response; and
presenting the follow-up response to the user.

18. The non-transitory CRM of claim 17, wherein the operations further comprise:
receiving a second preliminary response from the second agent based on the preliminary request, the second preliminary response comprising a second confidence level measuring a likelihood of the second agent providing an accurate outcome based on the input.

19. The non-transitory CRM of claim 18, wherein the operations further comprise:
designating the first preliminary response from the first agent with a first priority; and
designating the second preliminary response from the second agent with a second priority less than the first priority,
wherein the second confidence level is higher than the first confidence level, and
wherein determining that the first agent is the first preferred agent is further based on the first priority exceeding the second priority.

20. The non-transitory CRM of claim 18, wherein determining that the first agent is the preferred agent is based on the first confidence level associated with the first agent being higher than the second confidence level associated with the second agent.

* * * * *